United States Patent
Catt et al.

[11] Patent Number: 6,112,513
[45] Date of Patent: *Sep. 5, 2000

[54] METHOD AND APPARATUS OF ASYMMETRIC INJECTION AT THE SUBSONIC PORTION OF A NOZZLE FLOW

[75] Inventors: Jeffrey Alan Catt, Benbrook; Daniel Nicholas Miller, Fort Worth, both of Tex.

[73] Assignee: Lockheed Martin Corporation, Fort Worth, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/906,768

[22] Filed: Aug. 5, 1997

[51] Int. Cl.[7] .................................. F02K 1/30; F02K 1/28
[52] U.S. Cl. .............................. 60/204; 60/231; 60/271; 239/265.17; 239/265.19
[58] Field of Search .......................... 60/230, 231, 271, 60/204, 266; 239/265.17, 265.19, 265.23, 127.3

[56] References Cited

U.S. PATENT DOCUMENTS

| | | | |
|---|---|---|---|
| 2,763,984 | 9/1956 | Kadosch | 239/265.23 |
| 2,812,636 | 11/1957 | Kadosch et al. | 239/265.23 |
| 2,952,123 | 9/1960 | Rich | 60/231 |
| 3,000,178 | 9/1961 | Logerot | 239/265.23 |
| 3,091,924 | 6/1963 | Wilder, Jr. | 60/271 |
| 3,144,752 | 8/1964 | Kepler | 60/35.54 |
| 3,204,405 | 9/1965 | Warren et al. | 239/265.23 |
| 3,270,505 | 9/1966 | Crabill et al. | 239/265.23 |
| 3,318,532 | 5/1967 | Gaubatz . | |
| 3,374,954 | 3/1968 | Card | 239/127.1 |
| 3,628,726 | 12/1971 | Johnson | 239/265.17 |
| 3,646,762 | 3/1972 | Hawk et al. | 60/204 |
| 3,698,642 | 10/1972 | McCullough | 239/265 |
| 3,747,874 | 7/1973 | Johnsen | 244/53 |
| 4,063,685 | 12/1977 | Jacobs | 239/265 |
| 4,351,479 | 9/1982 | Kranz et al. | 239/265 |
| 4,676,724 | 6/1987 | Dunaway et al. | 60/231 |
| 4,947,644 | 8/1990 | Hermant | 239/265.17 |
| 5,406,787 | 4/1995 | Terrier | 60/204 |
| 5,664,415 | 9/1997 | Terrier | 60/231 |
| 5,694,766 | 12/1997 | Smereczniak et al. | 239/265.23 |

OTHER PUBLICATIONS

AIAA 95–2603; Conceptual Development of Fixed–Geometry Nozzles Using Fluidic Injection for Throat Area Control; D.N. Miller, et al; Jul. 10, 1995, pp. 1–10.

AIAA 95–2604; A Static Investigation of Fixed–Geometry Nozzles Using Fluidic Injection for Throat Area Control; J.A. Catt, et al; Jul. 10, 1995; pp. 1–9.

AIAA 91–0317; Effects of Periodic Disturbances on Structure and Flame Length of a Jet in a Cross Flow; A. Eroglu, et al; Jan. 7, 1991; pp. 1–11.

(List continued on next page.)

*Primary Examiner*—Ted Kim
*Attorney, Agent, or Firm*—Gray Cary Ware & Freidenrich, LLP

[57] ABSTRACT

An apparatus and method for varying the effective cross sectional area of an opening through a fixed geometry nozzle provides a fluidic cross flow with an injector incorporated in the throat of the nozzle 68 proximate to the subsonic portion of the flow through the nozzle. One or more injectors 76 are directed at an injector angle opposed to the subsonic portion of the flow. The opposed cross flow from injector 76 interacts with a primary flow 14 through the nozzle 68 to partially block the nozzle's opening 72, thereby effectively decreasing the cross sectional area of opening 72 in a jet engine 42. A plurality of cross flows proximate to a nozzle's throat 70 permits effective afterburner 64 operations even with a fixed geometry nozzle by allowing throttling of the primary flow 14. Further, variations in the cross flow's mass flow characteristics or injection angle can allow vectoring of the primary flow 14.

27 Claims, 3 Drawing Sheets

OTHER PUBLICATIONS

AIAA 95–2605; Fluidic Control of Nozzle Flow—Some Performance Measurements; J. Federspiel, et al; Jul. 10, 1995; pp. 1–7.

AGARD; Fuels and Combustion Technology for Advanced Aircraft Engines; May 10, 1993; pp. 1–9.

Pulsed Jets in Cross–Flow; A.D. Vakili, et al; pp. 465–475.

ASME; Inlet and Nozzle Technology for 21st Century Fighter Aircraft; Marvin C. Gridley, et al; Jun. 10, 1996; pp. 1–8.

"Final Report on a Study of Rocket Thrust Control by Gas Injection," Technical Report distributed by Department of Defense "Defense Technical Information Center", DTIC, Acquiring Information–Imparting Knowledge, Cameron Station, Alexandria, Virginia 22304–6145—Unclassified, Gunter et al., 1961.

"Rocket Thrust Control by Gas Injection," Technical Report distributed by Department of Defense "Defense Technical Information Center", DTIC, Acquiring Information–Imparting Knowledge, Cameron Station, Alexandria, Virginia 22304–6145—Unclassified, Blaszak et al., 1960.

METHOD AND APPARATUS OF ASYMMETRIC INJECTION AT THE SUBSONIC PORTION OF A NOZZLE FLOW

RELATED PATENT APPLICATION

This patent application is related to U.S. application Ser. No. 08/906,731, filed on Aug. 5, 1997 entitled "Method and Apparatus of Pulsed Injection for Improved Nozzle Flow Control," which is incorporated herein by reference.

TECHNICAL FIELD OF THE INVENTION

This invention relates in general to the field of nozzles for controlling a fluid flow, and more particularly, to a nozzle for controlling a fluid flow, such as the exhaust flow exiting a jet engine, through the throat of the nozzle by varying the effective cross-sectional area of the throat with the injection of a cross flow opposed to the subsonic portion of the flow through the nozzle.

BACKGROUND OF THE INVENTION

Jet engines create thrust by directing a high energy exhaust stream from an exhaust nozzle. Typically, a jet engine accepts air through an inlet and compresses the air in a compressor section. The compressed air is directed to a combustion chamber, mixed with fuel, and burned. Energy released from the burning fuel creates a high pressure in the combustion chamber which forces the air through a turbine section and into an exhaust chamber. The high pressure air is then forced from the exhaust chamber through a nozzle, where the air exits the engine. Typically, as the air passes through the throat of the nozzle, it expands and accelerates from subsonic to supersonic speeds, essentially translating the energy of the exhaust flow from a pressure into a velocity. The energy level of the air in the exhaust chamber generally relates to the velocity of the air as it exits the nozzle. The greater the velocity of a given mass flow of air exiting an engine, the greater the thrust created by the engine.

Military aircraft commonly augment the energy level of the air in the exhaust chamber by using an afterburner. Afterburners add fuel to the exhaust chamber and ignite the fuel in the exhaust chamber, which increases the temperature and pressure of the exhaust flow. Although the energy added by afterburned fuel can greatly increase the thrust of the engine, the increased energy level can also have several adverse effects on the engine. First, increased pressure in the exhaust chamber can slow the flow of air through the compressor section and turbine section, causing the engine to stall. Second, the increased temperature and pressure in the exhaust chamber can overheat the walls of the exhaust chamber leading to a failure, such as a burn through of a wall, and related dangers.

To alleviate these difficulties, jet engines with afterburners typically use variable geometry nozzles to throttle the exhaust flow from the exhaust chamber. When afterburner is initiated, the circumference of the nozzle's throat is increased to increase the cross-sectional flow area through the throat. This increased cross-sectional area allows air to more easily escape from the exhaust chamber, thus decreasing the pressure in the exhaust chamber and, as the air expands and leaves the exhaust chamber, also decreasing the temperature of the air. Modern afterburning jet engines with variable geometry nozzles can require as much as a two-fold increase in cross-sectional throat area to maintain constant engine flow and back pressure in response to the extra thermal energy added by afterburning.

Although variable geometry nozzles allow the use of afterburner, they also have many inherent disadvantages which penalize aircraft performance. For instance, a variable geometry nozzle can make up a significant portion of the weight of an engine. Such nozzles are typically made of large, heavy metal flaps which mechanically alter nozzle geometry by diverting exhaust flow with physical blockage, and thus have to endure the high temperatures and pressures associated with exhaust gases. In the iris-type nozzles typically used on afterburner-equipped engines, the actuators used to adjust the nozzle flaps to appropriate positions in the exhaust flow tend to be heavy, expensive and complex because of the forces presented by the exhaust flow which the nozzle flaps must overcome. Further, the nozzle flaps typically constrict the exhaust flow by closing and overlapping each other, which allows hot air to escape between the flaps. These leaks cause reductions in thrust. Variable geometry nozzles are also difficult to implement on exotic nozzle aperture shapes typical of advance tactical fighter aircraft.

Attempts to reduce the disadvantages of variable geometry nozzles have had limited success. The state-of-the-art tactical aircraft is the Lockheed F-22 Raptor. The Raptor employs a two-dimensional variable geometry nozzle that can vector or turn the exhaust flow of the Raptor's engine to provide directional thrust control. Although the two-dimensional nozzle flaps of the Raptor provide better infrared and radar cross section characteristics than can be obtained from typical iris-type nozzles, even the Raptor's advanced system suffers from the above-mentioned disadvantages. For instance, air can leak along the intersection of the two-dimensional nozzle flaps, introducing inefficiency.

Attempts to use a fixed geometry nozzle with afterburning engines have met with only limited success due to the difficulty of maintaining flow through the engine when an overpressure is created by afterburner initiation. For instance, U.S. Pat. No. 5,406,787 issued to Terrier uses an additional compression stage to vary pressure during engine operation and afterburning to counteract temperature variations created by the afterburner in the exhaust chamber. However, this system requires modification to the engine and other complexities such as a control program to monitor and adjust pressure produced by the compression section.

Another method for using a fixed geometry nozzle with a jet engine is to inject a secondary flow of high pressure air across the primary flow as the primary flow passes through the nozzle, as is explained in "Conceptual Development of Fixed-Geometry Nozzles Using Fluidic Injection for Throat Area Control" AIAA-95-2603 and "A Static Investigation of Fixed-Geometry Nozzles Using Fluidic Injection for Throat Area Control" by J. A. Catt and D. N. Miller, AIAA-95-2604, July 1995. The secondary flow can partially block the exhaust exiting through the nozzle to decrease the flow through the nozzle when needed to increase the pressure within the exhaust chamber. When an overpressure exists in the exhaust chamber, the cross flow can be reduced or eliminated to increase the flow through the nozzle.

Although the injection of a secondary cross flow will support a fixed geometry nozzle in an afterburning jet engine, this method also introduces inefficiencies to the engine's operation. For instance, the amount of afterburning may be limited due to the lower effectiveness of secondary injection compared to the effectiveness of variable geometry nozzles. Also, injection of air across the flow of the exhaust tends to use a large amount of high pressure air to obtain effective nozzle blockage. Thus, injection can introduce inefficiency because the total momentum of the exhaust flow is decreased by the decreased flow from the compressor section into the combustion section when compressed air is bled from the compressor section for injection. This inefficiency can result in a reduced range of operations for a given fuel supply, and reduced power for a given fuel flow.

SUMMARY OF THE INVENTION

Therefore, a need has arisen for a method and apparatus that efficiently controls the flow through a nozzle by introducing a secondary fluidic cross flow to the flow field through the nozzle, the cross flow providing a maximum amount of blockage to the flow field through the nozzle with a minimal reduction in thrust efficiency. In accordance with the present invention, a cross flow is injected into the subsonic portion of the flow proximate to a nozzle's throat and opposed to the flow through the nozzle to substantially eliminate or reduce disadvantages and problems associated with previously developed variable geometry and fixed geometry nozzles.

A method and apparatus are provided for varying the effective cross-sectional area of a nozzle's opening by partially blocking the nozzle with a cross flow across the flow field through the throat of the nozzle. A primary flow accepted through an opening of a fixed geometry nozzle is constricted by the nozzle's throat so that the primary flow has a subsonic portion and a supersonic portion. An injector incorporated in the throat provides a cross flow opposed to the subsonic portion of the flow. The cross flow of the injector can asymmetrically block the primary flow through the nozzle resulting in a vectoring of the primary flow. Alternatively, the cross flow can symmetrically block the primary flow to throttle the primary flow.

More specifically, in one embodiment, a fixed geometry nozzle is coupled to the exhaust chamber of a jet engine. The nozzle has a throat leading to a divergent area, the divergent area having a low expansion ratio. A plurality of injectors, each of which can be formed as a slot, are incorporated within the throat of the nozzle proximate to the exhaust chamber of the engine and directionally opposed to the subsonic portion of the exhaust flow through the engine. Each injector is oriented to direct injected flow towards the flow field of the exhaust gas through the nozzle to optimize blockage of the nozzle opening. For instance, an injector can inject a fluid at an upstream angle relative to the flow field, such as an angle between zero and thirty degrees opposed to the primary flow, which travels along a longitudinal axis through the nozzle. Opposing injectors or slots injecting similar cross flows can provide symmetric blockage of the nozzle's opening to control the primary flow through the nozzle without changing the vector of the primary flow, thus throttling the engine. Injection of a cross flow from a single injector can provide an asymmetric blockage of the nozzle's opening to change the vector of the primary flow. An asymmetric cross flow from opposing injectors can provide both throttling and vectoring of the primary flow.

A source of high pressure air is provided to each injector, either from the compression section of the engine or from another convenient source, such as separate compressor. The high pressure air can be injected into the flow field as a steady stream, or in pulses by either a mechanical valve or an acoustic vibrator, such as a piezoelectric device. The frequency, amplitude and waveform of pulses can vary according to the amount of blockage desired at the nozzle, where different levels of blockage can provide predetermined degrees of flow vectoring or throttling . In one embodiment, each injector may rotate relative to the nozzle to provide a cross flow at different angles relative to the flow field. In another embodiment, the injected flow can include fuel which can be ignited to enhance blockage of the flow field. The flow field from the engine can be vectored or redirected by applying asymmetric injection at the nozzle, meaning injection at different mass flow rates from each of a plurality of injectors, injection with varied pulse frequency, amplitude or waveform at each such injector, or injection at different injection angles, or with different fuel flows from each injector.

The present invention provides many technical advantages over previously developed apparatus and methods for controlling a flow through a nozzle to allow throttling of an engine or vectoring of an engine's thrust. Injection, when used instead of or in combination with a variable geometry nozzle, can reduce the weight, cost, and complexity of a nozzle. An injection system reduces the weight of a nozzle by eliminating or limiting the need for durable heavy moving parts such as hinges, seals, actuators, hydraulics and other mechanical items necessary to open and close the typical iris type variable geometry nozzle.

Another technical advantage of the present invention is that an aircraft equipped with an engine and fixed-geometry nozzle using injection across a primary flow's flow field can be implemented to non-circular exhaust aperture shapes typical of advanced fighter concepts. These aperture shapes, such as elliptical or diamond shapes, allow for better blending and integration into the aircraft aft body structure than typical iris-type nozzles.

Another technical advantage of the present invention, particularly when a fixed geometry nozzle is used, is that alternative materials can be used for the nozzle structure with an eye towards thermal rather than mechanical constraints. For instance, ceramic materials can form a fixed nozzle supported directly by the structure of the aircraft. Such ceramic materials can provide a heavy duty heat resistance nozzle structure with much improved durability compared to conventional metal and carbon materials. The reduced complexity of such a fixed nozzle system will reduce the cost of operating and maintaining the aircraft and can increase the efficiency of operating the aircraft due to the significantly reduced weight of such a system. Further, a nozzle incorporated with the aircraft's structure can be shaped to minimize drag, thus increasing the aircraft's efficiency and range.

Another technical advantage of the present invention is that an asymmetric cross flow can provide vectoring of an engine's thrust. Thrust vectoring can allow aircraft control of pitch and yaw at all flying speeds, and can decrease the surface area of control surfaces, resulting in reduced aircraft drag and weight.

Another technical advantage of the present invention is that a fixed geometry nozzle can provide a combination of throttling and vectoring functions. Opposing injectors can provide throttling with nozzle blockage according to their combined mass flow and pulsing characteristics while also providing vectoring by varying the distribution, orientation or fuel flow of the total secondary flow between the injectors.

The injection system of the present invention offers additional technical advantages over previously developed injection techniques when the cross flow is pulsed. Pulsed injection of a fluidic cross flow can provide improved penetration into the fluidic flow compared to the penetration provided by steady state injection. This increased penetration enhances the blockage of the nozzle opening without increasing the time averaged mass flow of the injected cross flow. Thus, the effective cross sectional area of a nozzle and it's vector angle can be controlled with less overall fluidic cross flow injection. This increases the efficiency of the engine since less compressed air is needed by a pulsed cross flow compared to a steady state cross flow, and also decreases the size of the ducts needed to provide air to the injectors.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Preferred embodiments of the present invention are illustrated in the figures, like numerals being used to refer to like and corresponding parts of the various drawings.

Figure 1:
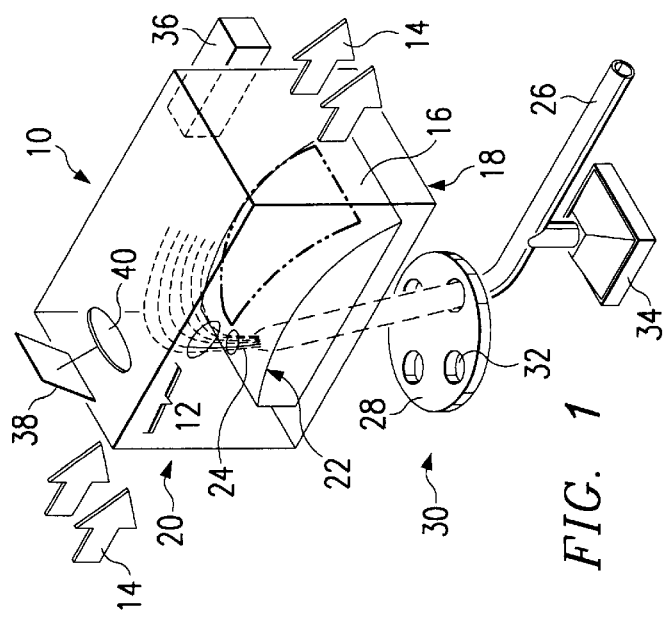
FIG. 1 depicts an experimental apparatus for pulsed injection nozzle flow control.

The injection system of the present invention can use steady state injection or pulsed injection of a cross flow to partially block a primary flow. Referring now to FIG. 1, an experimental apparatus for determining the effectiveness of pulsed injection is depicted. A flow container 10 having a rectangular shape defines a flow field 12 which contains a fluidic flow 14. Fluidic flow 14 passes over a nozzle contour 16 and leaves flow container 10 at container exit 18. Nozzle contour 16 cooperates with flow container 10 to form a nozzle 20. The cross sectional area of the opening of nozzle 20 varies along the longitudinal flow axis according to the area of the plane between the surface of nozzle contour 16 and the top wall of flow container 10 that is perpendicular to the longitudinal axis and the general vector of fluidic flow 14. Nozzle 20 constricts fluidic flow 14 with nozzle contour 16 in only one dimension to provide an accurate means for testing the effects of a fluidic cross flow. In other embodiments, nozzle 20 can include any convergent nozzle, divergent nozzle, or combination of convergent and divergent nozzles which accelerate or direct a fluidic flow by constricting the flow. Nozzle 20 has a throat 22 defined as the point along nozzle 20 of greatest constriction, the nozzle opening having the smallest cross sectional area at the throat.

A fluidic cross flow is provided to the opening through nozzle 20 by an injector 24 that is incorporated with nozzle contour 16 proximate to throat 22. As used herein, cross flow means any secondary flow provided to the primary flow 14. Injector 24 receives pressurized fluid from a duct 26, and provides the pressurized fluid into flow field 12 through a port formed at the end of injector 24.

FIG. 1 depicts two separate controllers for pulsing the fluid from injector 24 into nozzle 20 at throat 22. A high speed mechanical valve 28 provides periodic modulation of the pressure to injector 24 by rotating a ring 30 with valve openings 32 so that ring 30 periodically blocks flow through duct 26 and periodically allows flow through duct 26 when valve opening 32 corresponds to duct 26. The mechanical valve can provide a square pulse wave form having an amplitude that shifts from zero cross flow to full cross flow in a short transition time. FIG. 1 also depicts an acoustic pulse vibrator 34 associated with injector 24. Acoustic pulse vibrator 34 can be any vibrational device that provides modulated energy to duct 26. For instance, a piezoelectric vibrator can provide acoustic energy, similar to the energy produced by a stereo sound system. An acoustic vibrator can produce a wide variety of wave forms. In other embodiments, any effective means of modulating a flow can be used.

Injector 24 provides a pulsed fluidic cross flow to flow field 12, with the pulse determined by a controller, such as mechanical valve 28 or acoustic pulse vibrator 34. The controller associated with injector 24 can vary the pulse of the fluidic cross flow to have a predetermined frequency, amplitude, or wave form. For instance, mechanical valve 28 can vary the frequency of the pulse provided by injector 24 by varying the rate at which ring 30 rotates. In this example, the pulsed fluidic cross flow produced by injector 24 modulates from no flow when valve openings 32 are completely misaligned with duct 26 to having a full flow equal to the flow through duct 26 when valve openings 32 are completely aligned with duct 26. Mechanical valve 28 can provide a pulsed fluidic cross flow with varying amplitudes by either varying the pressure available in duct 26 or making valve opening 32 smaller relative to the size of duct 26, thereby reducing the flow to injector 24. Acoustic pulse vibrator 34 can provide a pulsed fluidic cross flow having a predetermined wave form by creating vibrations with a corresponding wave form along duct 26. For instance, a sinusoidal electrical signal provided to a piezoelectric vibrator could create sinusoidal mechanical energy along duct 26 which can be transmitted to the secondary flow through duct 26.

In operation, a primary fluidic flow 14 passes through flow container 10 towards container exit 18 along flow field 12. The fluidic flow can be any fluid, such as liquids or gases. As fluidic flow 14 passes through throat 22 of nozzle 20, injector 24 injects an unsteady or pulsed fluidic cross flow across flow field 12. Although FIG. 1 depicts a cross flow that is generally perpendicular to flow field 12, the cross flow could be injected at any angle opposed to or with the direction of fluidic flow 14. A pulsed laser 36 provides a laser beam to a mirror 38 which reflects the beam through a lens 40. The refraction of the beam as it passes from lens 40 through the flow 14 allows a visual determination of the effects of the pulsed fluidic cross flow upon flow 14. Blockage can be determined by measuring the primary fluid mass flow 14 upflow of the test section with a calibrated meter.

Blockage of a primary flow through a nozzle by a cross flow is related to the extent of penetration of the cross flow into the primary flow. The penetration of a cross flow into a primary flow is controlled by the cross flow momentum flux ratio, which is related to the mass and velocity of the primary and cross flows, and the change in velocity of the cross flow as it pulses. The greater the mass velocity of a cross flow exiting an injector relative to the mass velocity of a fluidic flow passing by the injector, the greater the penetration of the cross flow into the fluidic flow. Increased penetration of the cross flow can provide greater blockage of the primary flow through the nozzle, effectively decreasing the cross sectional area of the nozzle opening at the point of penetration.

Penetration of a cross flow into a primary flow can be enhanced when the cross flow rate is periodically modulated, or pulsed. Pulsing of an injector's flow rate forms trains of vortex rings with spacing and strength related to the characteristics of the pulse, such as the pulse's frequency, amplitude and wave form. The vortex rings created by the pulsed cross flow interact with the primary flow to enhance penetration of the cross flow into the primary flow by increasing the cross flow's net field momentum flux ratio. When placed proximate to the opening of a nozzle, such as at a nozzle's throat, an injector can increase the blockage of a flow through a nozzle by penetrating the flow, and effectively decreasing the cross sectional area of the opening of the nozzle. The amount of blockage will vary with the magnitude, characteristics, and available frequency of vortex ring production. For instance, low frequency mechanical valves can induce strong perturbations with vortex-ring-induced penetration due to the large shifts in amplitude available from such valves; in contrast, acoustic vibrations can introduce higher frequency pulse wave forms with smaller perturbations but less disruption to secondary flow pressure. Alternatively, a combination of mechanical and acoustic induced vibrations can produce unique primary flow disruption characteristics. Due to the interaction of the vortex rings with the primary flow 14, maximum blockage of nozzle 20 for a given primary flow 14 could occur at frequencies that are different than the frequency that provides greatest penetration into flow 14.

The apparatus depicted in FIG. 1 allows an experimental determination of maximum blockage for a particular nozzle contour with a primary flow and a variety of cross flows. First, a baseline for the blockage caused by steady-state injection can be determined for a particular primary to cross flow velocity ratio. Steady, unsteady or pulsed cross flows can then be injected into the primary flow under a variety of conditions, with the unsteady and pulsed cross flows having the same mean flow rate as the steady cross flow. At proper frequencies, amplitudes and waveforms, pulsed injection of the cross flow provides enhanced blockage over the blockage provided by steady state injection due to the vortex rings formed as the cross flow changes over time. The pulsed cross flow can be tuned by testing different pulsing frequencies, amplitudes and waveforms to achieve maximum blockage for a given mean flow rate of the cross flow. Thus, a pulsed cross-flow injector can increase fluidic blockage of a primary flow through a nozzle compared to the blockage provided by a steady-state injector because of the periodic modulation of the injectant, the increased blockage being created without a net increase in time-averaged injectant mass flow.

It is important to understand that, as used herein, a pulsed flow is a flow with mass flow characteristics that change periodically over time in a regular or repeated pattern. A pulsed cross flow can achieve a predetermined blockage of a primary flow to support flow throttling or vectoring. The periodic changes can be a pulse having a particular frequency, wave form or amplitude that maximizes blockage by maximizing the momentum flux for a given mean flow rate.

In alternative embodiments, either a steady or an unsteady cross flow can be used to achieve a predetermined blockage of a given primary flow. As used herein, an unsteady cross flow means a cross flow with mass flow characteristics that change over time but that do not necessarily change in a particular or periodic repeated pattern; a steady cross flow means a cross flow with generally constant mass flow characteristics. A pulsed cross flow is a type of unsteady cross flow. An unsteady cross flow can maintain constant blockage of a nozzle opening for a given primary flow because of the vortices created by the change in the mass flow characteristics of the cross flow even though the change in mass flow characteristics does not follow a repeating pattern. As used herein, an unsteady cross flow does not mean changes in mass flow characteristics of a steady cross flow being used to control a primary flow, such as cross flow changes to increase or decrease nozzle blockage for a constant primary flow, or cross flow changes to maintain a constant nozzle blockage in response to changes in the mass flow characteristics of the primary flow.

Figure 2:
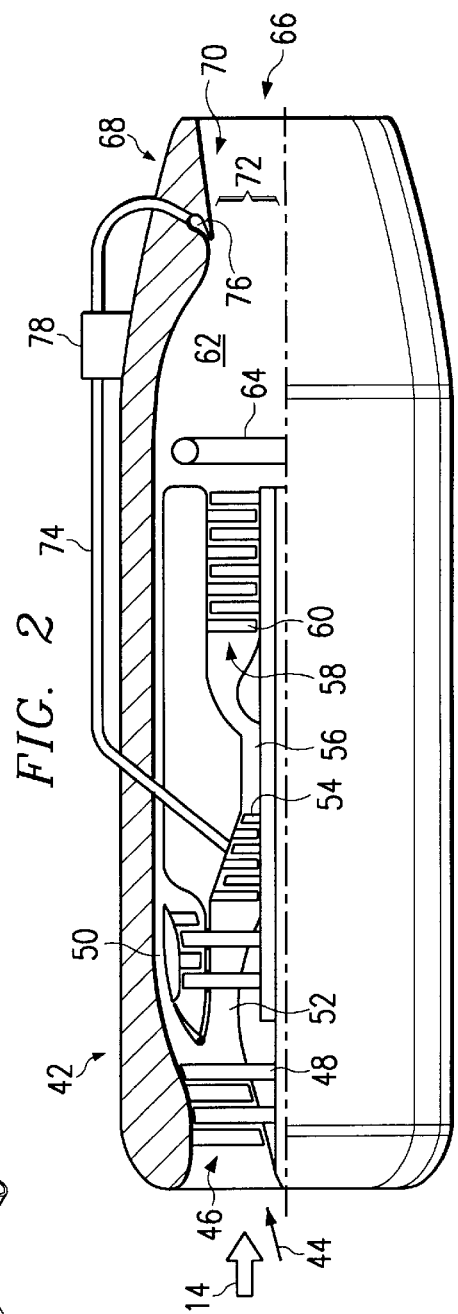
FIG. 2 depicts a side sectional view of jet engine equipped with pulsed injection nozzle flow control.

FIG. 2 depicts a jet engine configured with a pulsed fluidic cross flow injector according to the present invention. A primary fluidic flow 14 of air enters jet engine 42 through intake 44. Fan section 46, comprised of a plurality of rotating fan blades 48, pushes flow 14 into bypass section 50 and compressor section 52. Compressor section 52 is comprised of a plurality of compressor blades 54 which compress flow 14 into combustion chamber 56. Fuel is mixed with flow 14 in combustion chamber 56 and ignited, thereby adding energy to flow 14, resulting in an increased pressure and temperature of flow 14 in combustion chamber 56. Pressure within combustion chamber 56 forces flow 14 into turbine section 58, which is comprised of a plurality of turbine blades 60. Turbine section 58 removes some energy from flow 14 to power compressor section 52 and fan section 46. Flow 14 then passes into exhaust chamber 62 where it combines with the flow from bypass section 50. An afterburner 64 can provide additional fuel which can be ignited to increase the energy of flow 14. Flow 14 is then expelled from engine 42 through exit 66 as an exhaust flow.

Engine 42 creates thrust related to the velocity of the mass and density of the air of flow 14 over a given time period. Typically, in a jet engine, flow 14 is a subsonic flow of air until it reaches throat 70. A nozzle 68 cooperates with exit 66 to accept flow 14 from exhaust chamber 62 and to accelerate exhaust flow 14 to higher velocities, typically supersonic velocities. To achieve optimum acceleration of the exhaust flow, nozzle 68 converges the flow at throat 70, which is the point or section in nozzle 68 having the smallest cross sectional area, the constriction of throat 70 typically accelerating the flow to a sonic velocity, and a supersonic velocity after throat 70. Constriction of the flow at throat 70 operationally translates energy in the flow from pressure and temperature into velocity, thus creating thrust opposite to the vector of flow 14 as flow 14 exits nozzle 68. Although nozzle 68 is depicted as a fixed geometry nozzle, it should be understood that variable geometry nozzles can be incorporated with the present invention to enhance control of the exhaust flow.

An air duct 74 collects high pressure air from flow 14 at compressor section 52 and provides the high pressure air to injector 76. In alternative embodiments, air duct 74 can collect air from bypass section 50, combustion chamber 56 or any other portion of engine 42 having high pressure air. In an alternative embodiment, a separate compressor can provide high pressure air to air duct 74. A controller 78 controls the pressurized air in duct 74 to create an unsteady or pulsed secondary flow and to send that secondary flow to injector 76 for injection proximate to nozzle 68. Proximate to nozzle 68, as used herein, means a position that will result in some blockage of nozzle opening 72 by the interaction of the cross flow from injector 76 and exhaust flow 14 exiting exhaust chamber 62. Air duct 74 can provide compressed air to two or more opposing injectors 76 located on opposite sides of the interior wall of nozzle 68.

In operation, controller 78 can vary the frequency, amplitude, and wave form of the pulsed cross flow from injector 76 so as to optimize performance of engine 42. For instance, to enhance the acceleration of exhaust flow 14 as it exits from exhaust chamber 62 through exit 66, the effective cross sectional area of nozzle opening 72 can be made smaller. Controller 78 can direct each of opposing injectors 76 to inject a pulsed cross flow having mass flow and pulse characteristics adequate to effectively decrease the cross sectional area of opening 72 of nozzle 68 to not only ensure proper acceleration of exhaust flow 14, but also to throttle flow 14 to control the pressure and temperature within exhaust chamber 62. If each injector 76 injects a cross flow with similar characteristics, flow 14 can be accelerated without changing its vector. In one embodiment, a mechanical valve could provide a square pulse waveform with a frequency of between 100 and 1000 hertz. In another embodiment, each injector 76 could be controlled by its own associated controller 78. Controller 78 can include a processor and software to control a nozzle's effective cross sectional area over a range of operating conditions.

When engine 42 is operated at varying power settings, the energy level of flow 14 is varied by, for instance, fluctuation of the amount of fuel in combustion chamber 56. A greater energy level added to flow 14 increases the pressure and temperature in exhaust chamber 62. Typically, jet engines increase the cross sectional area of the nozzle when afterburner is selected. At high flow energy levels, controller 78 can direct injector 76 to provide a cross flow with decreased blockage to reduce pressure in exhaust chamber 62 by creating a greater effective cross sectional area in opening 72. When the energy level of flow 14 is maximized by providing fuel into exhaust chamber 62 with afterburner 64 the exhaust flow in exhaust chamber 62 can create an over-pressure which can cause a backflow of air through bypass chamber 50 and, in extreme situations, through turbine section 58. To minimize the effects of the backpressure created in exhaust chamber 62 by initiation of afterburner 64, controller 78 can direct injector 76 to provide no or just minimal blockage of nozzle opening 72, thus effectively increasing the cross sectional area of nozzle opening 72. Those skilled in the art will appreciate that the system depicted in FIG. 2 can perform or supplement the functions of a variable geometry nozzle to adjust the effective cross sectional area of a nozzle over a jet engine's full power range.

Figure 3:
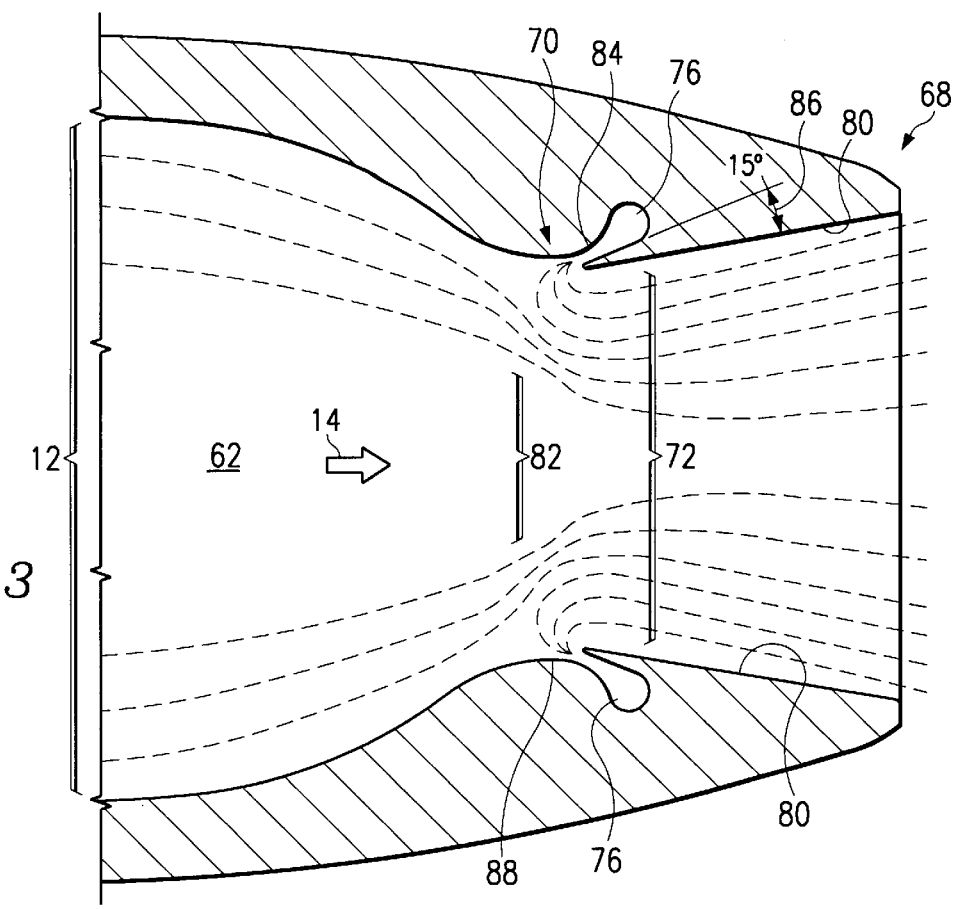
FIG. 3 depicts a side sectional view of injectors incorporated in a nozzle.

FIG. 3 depicts one embodiment of an injector 76 according to the present invention, and the effect that injector 76 can have on flow 14 exiting an exhaust chamber 62 through nozzle opening 72. When injectors 76 are turned off so that they do not inject a cross flow, the effective cross sectional area of nozzle opening 72 is defined by the area of the plane generally perpendicular to flow 14 between the walls 80 of nozzle 68. When symmetric and opposed injectors 76 provide similar cross flows 84 into flow 14, the cross flows evenly block the nozzle's opening to vary the nozzle's discharge coefficient, which is analogous to effective cross sectional flow area, to decrease the effective cross sectional area of nozzle opening 72 to the area depicted by numeral 82. Thus, nozzle opening 72 depicts an effective cross sectional area that could correlate to an engine in afterburner, and nozzle opening 82 depicts an effective cross sectional area that could correlate to an engine when not afterburning.

Modern jet aircraft typically use variable geometry nozzles to control throat area. In an afterburning turbofan engine, as much as a two-fold increase in throat area can be required to throttle engine operating pressure and stall margin during afterburner operation. To achieve a minimum possible effective throat area, injector 76 can include several features in addition to pulsed cross flow.

First, injector 76 should provide an airflow with maximum penetration into the primary flow 14. To achieve the best penetration, injector 76 should provide a sonic or supersonic secondary flow, such as can be obtained from a choked injector having an expansion area ratio of approximately 1.1. The supersonic velocity of the injected cross flow should also provide optimal mass flow characteristics. Injector 76 should provide a secondary flow with a corrected mass flow parameter and secondary to primary total pressure ratio that are as large as possible to enhance reduction of the nozzle's discharge coefficient. For example, an injected corrected ed mass flow of 15%, and a total pressure ratio of 2, relative to the primary flow, 2 are estimates of the maximum allowable properties within aircraft system weight and volume design constraints. In one alternative embodiment, the mass flow characteristics could be further enhanced by the addition of ignited fuel or other injectants to the secondary flow.

Next, the orientation and location of injector 76 can be arranged to maximize penetration into primary flow 14. Injector 76 provides a cross flow 84 that is an injection angle 86 from being completely opposed to the direction of primary flow 14 along the longitudinal axis of nozzle 68. FIG. 3 depicts angle 86 as 15 degrees from the longitudinal axis of nozzle 68, although angles of between zero and 30 degrees will provide enhanced blockage of nozzle opening 72. In one alternative embodiment, the angle 86 of injector 76 can be adjusted to a range of values. Injector 76 is located at the beginning of throat 70 so that the secondary flow from injector 76 is aimed into the subsonic portion of the nozzle flow field 12. Injection of the secondary flow into the subsonic portion of the flow field prevents the formation of shocks, which can significantly impact the nozzle's thrust efficiency.

Figure 4:
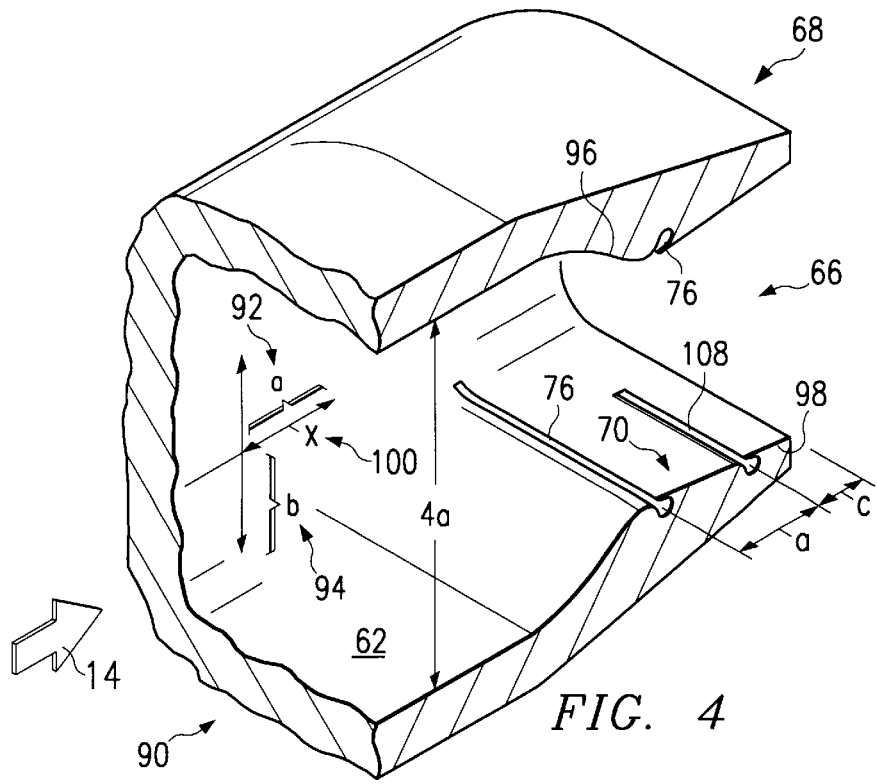
FIG. 4 depicts a perspective sectional view of a nozzle having slot injectors incorporated at its throat.

Finally, injector 76 can be incorporated into various nozzle designs so that the nozzle design, injector mass flow characteristics, injector orientation, injector location and the cross flow pulse characteristics cooperate to provide maximum blockage for a given secondary flow. Referring to FIG. 4, one effective internal nozzle convergence contour is depicted. Exhaust chamber 62 is adapted to accept engine exhaust at an afterburner duct 90, and to provide the exhaust to throat 70. Exhaust chamber 62 has a high discharge, smooth transition contour shape. Although exhaust chamber 62 can have a variety of profiled choked nozzle convergence shapes to enhance the effect of injectors 76, an ellipse shape is depicted in FIG. 4. The ellipse shape has a major axis 92 with a vertices along its major axis having a length depicted as a, and a minor axis 94 with a vertices along its minor axis having a length depicted as b. The afterburner duct 90 into exhaust chamber 62 has a diameter proportional to major axis 92, such as four times the distance a. Length b of minor axis 94 establishes the contraction ratio of nozzle 68, meaning the ratio of the areas of afterburner duct 90 and throat 70, and can be set at a value similar to that of the F110-GE-129 turbofan engine's nozzle, such as approximately 1.8.

The ellipse shape of exhaust chamber 62 depicted in FIG. 4 blends into throat 70 with a fillet-radius shaped convergence section 96. Throat 70 has a constant area along a throat length from its intersection with convergence section 96 to its intersection with a divergent section 98, the length being proportional to major axis 92, such as a length of a. The constant cross sectional area of throat 70 along its throat length raises the nozzle's discharge coefficient without injection, and lowers the discharge coefficient with injection. Divergent section 98 accepts flow 14 from throat 70 and directs flow 14 along a length c of approximately 12 inches to ensure reattachment of flow 14 to the walls of nozzle 68 before flow 14 is discharged through exit 66. Divergent section 98 has a low degree of expansion, such as an expansion area ratio of 1.1 where expansion area ratio is defined as the cross sectional area at exit 66 divided by the cross sectional area of throat 70. The low degree of expansion of divergent section 98 reduces the nozzle's discharge coefficient with injection, and raises the nozzle's gross thrust coefficient with and without injection.

Throat 70 can have a number of aperture shapes, including an axisymmetric, rectangular (2-D), elliptical, diamond and triangular shapes. FIG. 4 depicts a rectangular throat aperture which supports two opposing injectors 76 formed as slots that encompasses the full periphery of the top and bottom of the rectangular-shaped throat 70. Each injector 76 can provide a uniform flow along the entire slot from a single duct, or can include a number of smaller injection components within each slot which can cooperate to provide a uniform flow or a flow that varies along the slot. Injector 76 is placed within throat 70 proximate to exhaust chamber 62, such as one nozzle throat radius from the nozzle's centroid 100.

Figure 5:
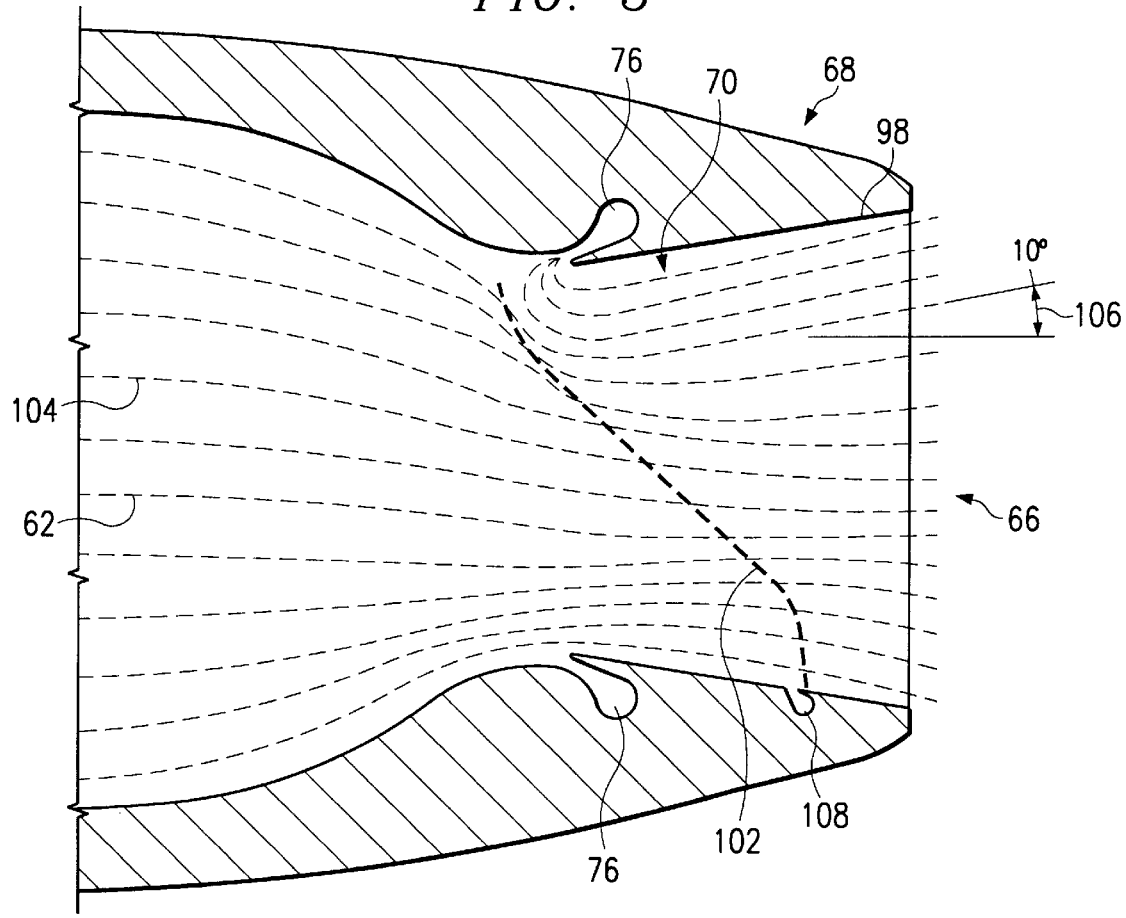
FIG. 5 depicts a side sectional view of a nozzle providing asymmetric injection to vector an exhaust flow.

In operation, exhaust chamber 62 accepts an exhaust flow 14 from a jet engine through afterburner duct 90 and directs flow 14 through throat 70 and divergent section 98 to exit through opening 66. Flow 14 accelerates as it passes through throat 70 to produce thrust opposite the direction of flow 14. The interaction of the high discharge smooth transition contour shape of exhaust chamber 62 with the proportionally-shaped throat allows nozzle 68 to operate at a relatively low pressure within exhaust chamber 62. The relatively low pressure within exhaust chamber 62 allows flow 14 to enter afterburner duct 90 and throat 70 at subsonic speeds, but to accelerate to supersonic speeds as it passes through throat 70 and expands into divergent section 98. Thus, a cross flow from an injector 76 located proximate to throat 70 will not cause the creation of a shock wave if the cross flow is directed at flow 14 when it is subsonic. Flow 14 reaches supersonic speeds along a sonic plane 102 which is depicted in FIG. 5, and which occurs after flow 14 passes injectors 76. Sonic plane 102 divides flow 14 into a subsonic portion proximate to exhaust chamber 62, and a supersonic portion proximate to exit 66.

Referring now to FIG. 5, lines 104 represent the mass flow characteristics of flow 14 passing through nozzle 68. As flow 14 passes through throat 70, the energy of flow 14 is translated from a high pressure and low velocity into a low pressure and high velocity. Injector 76 provides a cross flow that partially blocks throat 70 and thus skews sonic plane 102 of flow 14. When a plurality of injectors provide a symmetrical cross flow around the periphery of throat 70, the effective cross sectional area of throat 70 is decreased, causing an increase in pressure within exhaust chamber 62 and an increase in the velocity of flow 14 as it accelerates through throat 70. The pressure within afterburner duct 88 can be controlled by controlling the amount of blockage provided by the cross flow from injectors 76.

When an injector 76 provides an asymmetric cross flow around the periphery of throat 70 into the subsonic flow 14, flow 14 expands more rapidly along the nozzle wall associated with the greater blockage of throat 70, inducing the expanding flow proximate to the greater blockage to reach sonic speeds more rapidly than flow distal to the greater blockage. The ten degree deflection indicated by angle 106 reflects the vectoring of thrust which could result from the introduction of an asymmetric cross flow at the subsonic portions of flow 14. The asymmetry of the cross flow can be created by a number of variations to the flow from each injector 76, including variations to the injection orientation, mass flow characteristics, and pulse frequency, wave form, and amplitude. The asymmetric cross flow is created because each injector 76 has defined, localized influence on flow 14, which can be further controlled by separating each injector with sidewalls.

A supplemental injection port 108 can enhance thrust vectoring produced by an asymmetric cross flow from injectors 76 by providing an additional cross flow to flow 14 aft of sonic plane 102. Port 108 provides an additional cross flow to skew sonic plane 102 towards port 108, but does not produce a shock wave. Supplemental injection port 108 can be formed as a slot along one axis of a rectangular-shaped nozzle aperture, as is depicted in FIG. 5, and can provide a steady, unsteady or pulsed flow.

The throttling and vectoring functions of nozzle 68 can be combined to provide a versatile nozzle design for afterburning or other engines. Total injected mass flow from injectors 76 can control throttling by providing a proper amount of blockage of nozzle 68 at throat 70. The distribution of the injected mass flow asymmetrically between different injectors provides vectoring for a given throttle setting, with the angle of vector dependent upon the distribution of the injected mass flow. Similarly, variations in pulsing characteristics and injector orientation can provide simultaneous throttling and vectoring of flow 14. In a nozzle having some variable geometry characteristics, variations in the contour and shape of the exhaust chamber, convergence section, throat and divergent section can also enhance vectoring of flow 14.

A nozzle that provides a combination of throttling and vectoring of an exhaust flow from a jet engine can provide many advantages, particularly in high performance tactical aircraft. A fixed nozzle comprised of thermally-optimized materials, as opposed to mechanically-oriented materials, can be incorporated into an aircraft, dramatically decreasing the weight and complexity of the aircraft's propulsion system. The thrust produced by exhaust flow from the aircraft's engine can produce pitch and yaw vectors without the movement of external surfaces, resulting in smaller external surfaces at the tail of the aircraft and an associated reduction in aircraft drag. A fixed nozzle can also be applied to non-circular aperture shapes. Injection of a cross flow into the subsonic primary flow can produce vectoring and throttling without creating shocks and the thrust losses associated with such shocks.

Although the present invention has been described in detail, it should be understood that various changes, substitutions and alterations can be made hereto without departing from the spirit and scope of the invention as defined by the appended claims.

What is claimed is:

1. A small area expansion nozzle comprising:
   an opening for accepting a primary flow through the nozzle;
   a smooth convergent portion of the nozzle wherein said primary flow is subsonic;
   a physical throat coupling said converging portion to a diverging portion of the nozzle downstream of said physical throat;
   at least one primary injector located proximate to said physical throat wherein said at least one primary injector is oriented to oppose said primary flow; and at least one supplemental injector, wherein said at least one supplemental injector is located in the nozzle downstream of said at least one primary injector, wherein said at least one supplemental injector is oriented at an angle to oppose said primary flow and wherein said at least one primary and supplemental injectors provide a cross flow field opposed to said subsonic primary flow in order to vary an effective throat within the nozzle.

2. The nozzle of claim 1, wherein asymmetric injection of said cross flow field by said at least one primary and supplemental injectors varies a size, location, and orientation of said effective throat to vector said primary flow through the nozzle.

3. The nozzle of claim 1 wherein the nozzle has a longitudinal axis and wherein said at least one primary and supplemental injector directs the cross flow at an injection angle between zero and thirty degrees from the longitudinal axis of the nozzle.

4. The nozzle of claim 1 wherein said at least one primary and supplementary injector directs the cross flow at an injection angle of fifteen degrees from said longitudinal axis.

5. The nozzle of claim 1 wherein said cross flow is a sonic cross flow.

6. The nozzle of claim 1 wherein said cross flow is a supersonic cross flow.

7. The nozzle of claim 1 wherein said cross flow comprises a pulsed flow.

8. The nozzle of claim 1 wherein said at least one primary and supplemental injectors are formed as slots.

9. The nozzle of claim 1 wherein the nozzle is adapted to accept an exhaust flow of a jet engine as said primary flow.

10. The nozzle of claim 1 wherein the nozzle is a fixed geometry nozzle.

11. The nozzle of claim 1 wherein the nozzle is a variable geometry nozzle.

12. A small area expansion nozzle to vector the exhaust flow from a jet engine, comprising:
    an opening for accepting the exhaust flow;
    a converging portion of the nozzle wherein the exhaust flow is subsonic velocity;
    a physical throat coupling said converging portion to a diverging portion of the nozzle downstream of said physical throat;
    at least one primary injector located proximate to said physical throat wherein said at least one primary injector is oriented at an angle to oppose said primary flow; and
    at lease one supplemental injector, wherein said at least one supplemental injector is located in the nozzle downstream of said at least one primary injector, wherein said at least one supplemental injector is oriented at an angle to oppose said primary flow and wherein said at least one primary and supplemental injectors provide a pulsed cross flow field opposed to said subsonic primary flow in order to vary an effective throat within the nozzle.

13. The nozzle of claim 12 wherein the jet engine has a yaw axis and a pitch axis, and wherein varying said effective throat creates a yaw vector.

14. The nozzle of claim 12 wherein the jet engine has a yaw axis and a pitch axis, and wherein varying said effective throat creates a pitch vector.

15. The nozzle of claim 12 wherein said at least one primary and supplemental injectors comprise a slot.

16. The nozzle of claim 12 wherein said pulsed cross flow is a pulsed sonic cross flow.

17. The nozzle of claim 12 wherein said pulsed cross flow is a pulsed supersonic cross flow.

18. The nozzle of claim 12 wherein an injection angle of said pulsed cross flow is between zero and thirty degrees from a longitudinal axis of the nozzle.

19. The nozzle of claim 12 wherein an exhaust chamber of the jet engine comprises a high discharge smooth transition contour shape.

20. The nozzle of claim 19 wherein said physical throat has a length proportional to a shape of said exhaust chamber.

21. The nozzle of claim 20 wherein the jet engine has a compressor section, and wherein the nozzle further comprises an air duct having an intake associated with the compressor section and having an output associated with the injectors, said air duct providing compressed air to the injectors.

22. The nozzle of claim 12 wherein said pulsed cross flow comprises ignited fuel.

23. A method for vectoring a primary flow through a small area expansion ratio nozzle, comprising the steps of:
    directing the primary flow through a physical throat of the nozzle wherein the nozzle comprises:
        an opening for accepting a primary flow through the nozzle;
        a smooth convergent portion of the nozzle wherein said primary flow is subsonic;
        a physical throat coupling said converging portion to a diverging portion of the nozzle downstream of said physical throat;
        at least one primary injector located proximate to said physical throat wherein said at least one primary injector is oriented at an angle to oppose said primary flow; and
        at least one supplemental injector, wherein said at least one supplemental injector is located in the nozzle downstream of said at least one primary injector, wherein said at least one supplemental injector is oriented at an angle to oppose said primary flow and wherein said at least one primary and supplemental injectors provide a pulsed cross flow field opposed to said subsonic primary flow in order to vary an effective throat within the nozzle;
    directing a pulsed cross flow at the subsonic portion of the primary flow, wherein said pulsed cross flow opposes the primary flow; and
    varying an effective throat of the nozzle.

24. The method of claim 23 wherein said pulsed cross flow has a generally equal mass flow rate to symmetrically vary said effective throat of the nozzle.

25. The method of claim 23 wherein said pulsed cross flow asymmetrically varies as to size, location and orientation of said effective throat.

26. The method according to claim 23 wherein said pulsed cross flow is a pulsed sonic cross flow.

27. The method according to claim 23 wherein said pulsed cross flow is a pulsed supersonic cross flow.

* * * * *